United States Patent [19]
Moodie et al.

[11] 4,436,585
[45] Mar. 13, 1984

[54] METHODS FOR MAKING CONNECTION INSULATORS

[75] Inventors: Eldon E. Moodie; Richard D. Burns, both of Holland, Mich.

[73] Assignee: General Electric Company, Fort Wayne, Ind.

[21] Appl. No.: 356,591

[22] Filed: Mar. 9, 1982

Related U.S. Application Data

[63] Continuation of Ser. No. 871,681, Jan. 23, 1978, abandoned.

[51] Int. Cl.³ .......................... B65D 73/02; B31F 1/20
[52] U.S. Cl. .................................... 156/73.1; 156/196; 156/207; 156/210; 156/250; 156/292; 174/138 E; 428/178; 428/182; 428/186
[58] Field of Search .............. 428/156, 182, 186, 172, 428/178; 156/146, 147, 210, 73.1, 196, 207, 73.5, 250, 272, 292, 244.18, 364; 206/338, 332; 174/138 E, 137 R, 138 R

[56] References Cited

U.S. PATENT DOCUMENTS

| | | | |
|---|---|---|---|
| 2,547,880 | 4/1951 | Meyer et al. | 154/31 |
| 3,222,239 | 12/1965 | Deans | 156/380 |
| 3,259,864 | 7/1966 | Marzolf et al. | 336/192 |
| 3,457,442 | 7/1969 | Charlton et al. | 310/71 |
| 3,506,898 | 4/1970 | Gawron et al. | 318/138 |
| 3,609,427 | 9/1971 | Lautner et al. | 310/43 |
| 3,748,510 | 7/1973 | McNeal | 310/71 |
| 3,748,511 | 7/1973 | Crabb | 310/71 |
| 3,785,899 | 1/1974 | Fielding | 156/209 |
| 3,792,952 | 2/1974 | Hamon | 425/343 |
| 3,812,963 | 5/1974 | Zahuranec et al. | 206/468 |
| 3,904,031 | 9/1975 | Kessler | 206/328 |
| 3,905,475 | 9/1975 | Pritulsky et al. | 156/580 |
| 3,912,957 | 10/1975 | Reynolds | 310/71 |
| 3,974,407 | 8/1976 | Dochterman | 310/71 |
| 3,979,615 | 9/1976 | Neff | 310/71 |
| 3,982,978 | 9/1976 | Carpenter | 156/73.2 |
| 3,984,908 | 10/1976 | Ackley | 310/71 |
| 4,004,169 | 1/1977 | Charlton | 310/71 |
| 4,041,604 | 8/1977 | Ackley | 29/628 |

FOREIGN PATENT DOCUMENTS

| | | |
|---|---|---|
| 2042429 | 2/1971 | Fed. Rep. of Germany . |
| 2245576 | 4/1973 | Fed. Rep. of Germany . |
| 2216083 | 8/1974 | Fed. Rep. of Germany . |
| 2218628 | 9/1974 | France . |
| 927711 | 6/1963 | United Kingdom . |
| 954603 | 4/1964 | United Kingdom . |
| 977298 | 12/1964 | United Kingdom . |
| 984788 | 3/1965 | United Kingdom . |
| 1025077 | 4/1966 | United Kingdom . |
| 1432892 | 4/1976 | United Kingdom . |

Primary Examiner—Paul J. Thibodeau
Attorney, Agent, or Firm—Ralph E. Krisher, Jr.

[57] ABSTRACT

Connection insulators having a plurality of insulating compartments for electrically isolating electrical connections formed from strips of insulating material of indeterminate length. In one embodiment, a first strip of insulating material is supplied to a securing station at a predetermined average rate of supply and a second strip of insulating material is supplied to a forming station at a predetermined average rate of supply greater than the predetermined average rate of supply of the first strip with the pliability of the second strip being enhanced by heating the strip for aiding the deformability characteristics of the second strip. The second strip of insulating material is deformed into predetermined patterns at the forming station and then moved into position adjacent to the first strip of insulating material at the securing station. The two strips are secured together by ultrasonically welding the strips at the securing station and then advanced and positioned at a cutting station, for severing the two insulating strips for establishing a connection insulation having a plurality of insulating compartments or pockets. In another embodiment, a plurality of insulating compartments are established by securing together a first strip or sheet of insulating material and a second strip or sheet of insulating material, and then the compartments are substantially closed at one end thereof by reconfiguring one of the strips of insulating material.

15 Claims, 17 Drawing Figures

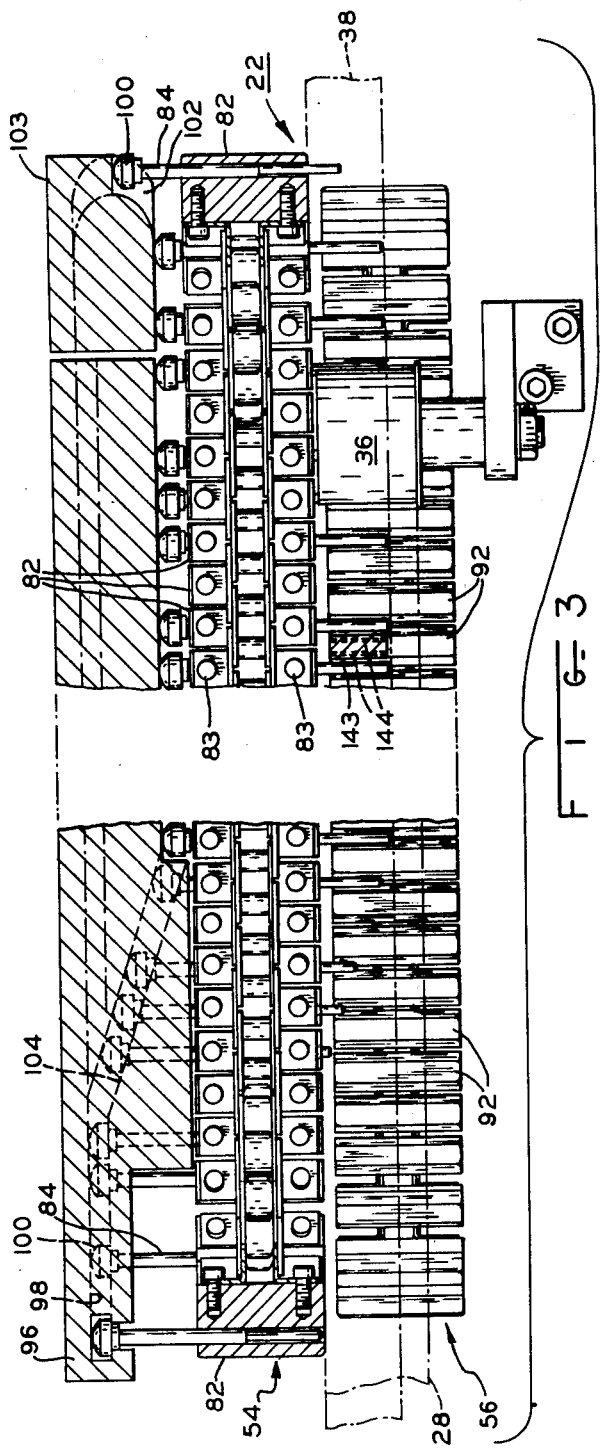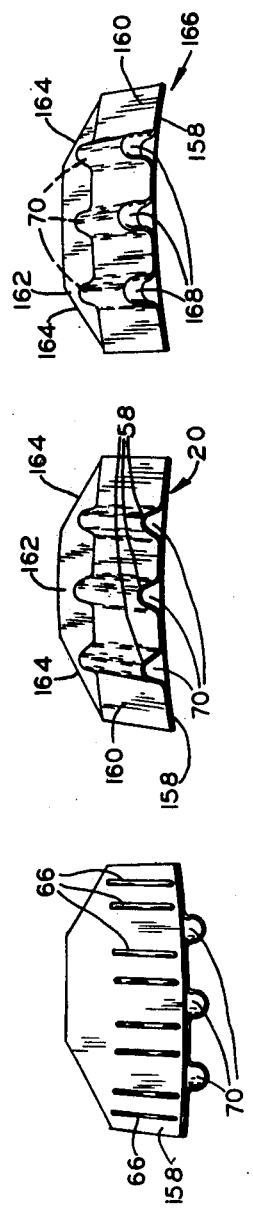

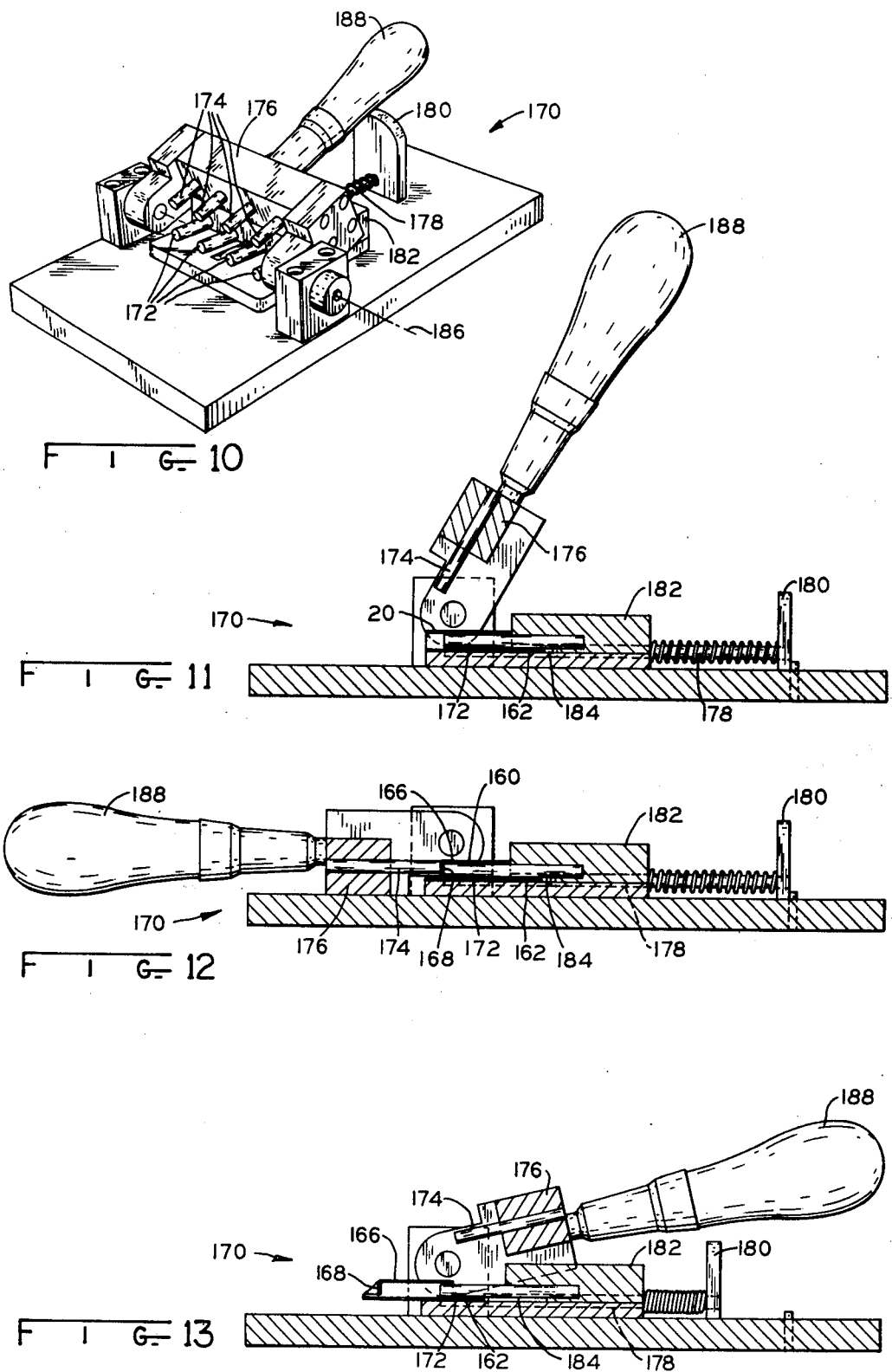

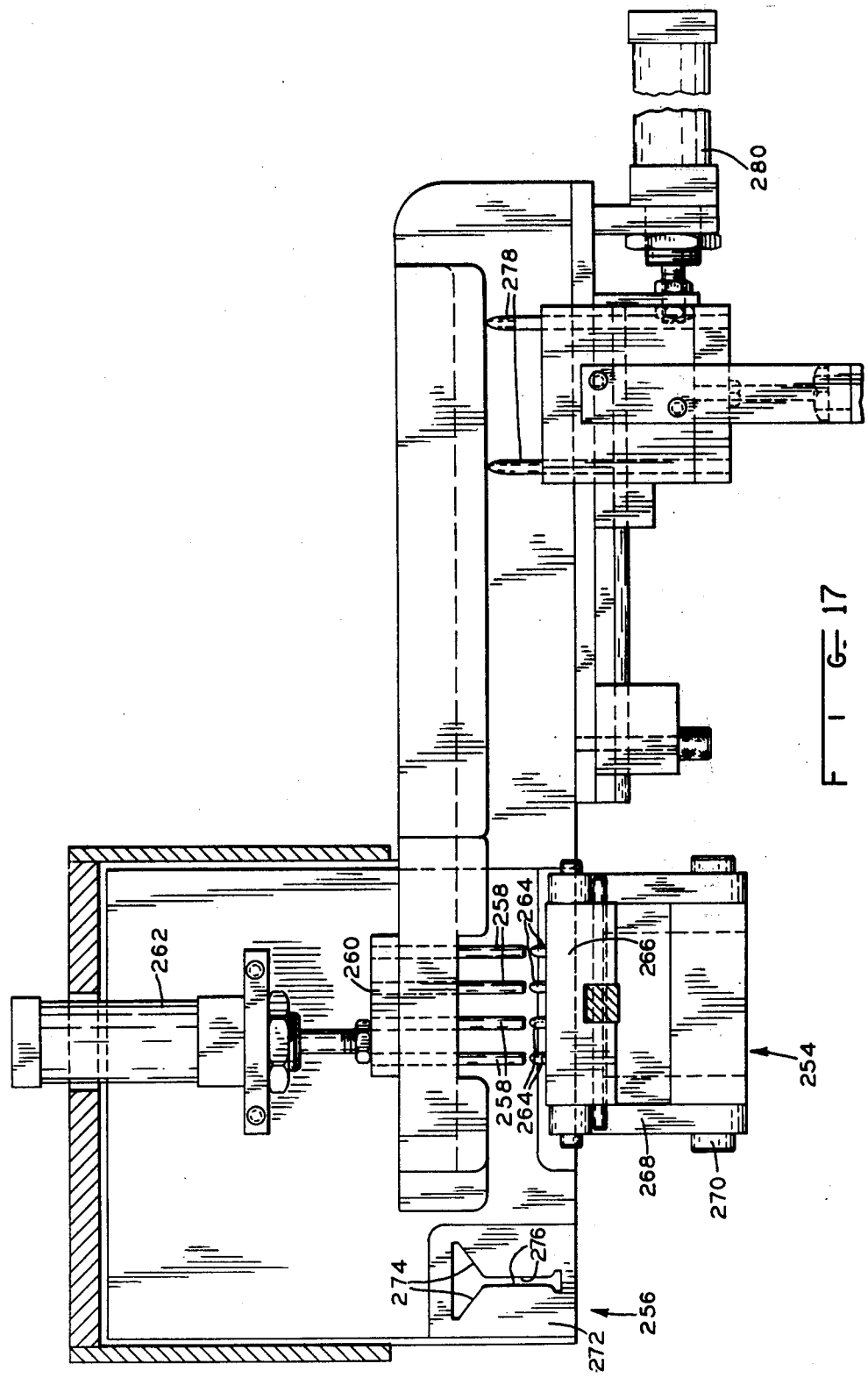

METHODS FOR MAKING CONNECTION INSULATORS

This is a continuation of application Ser. No. 871,681, filed Jan. 23, 1978, now abandoned.

BACKGROUND OF THE INVENTION

The present invention relates generally to connection insulators for dynamoelectric machine stator assemblies and more specifically to methods for fabricating connection insulators for electrically isolating a plurality of electrical connections of the stator assemblies.

As is well known in the art, dynamoelectric machine stator assemblies may often comprise a magnetic core having a bore, axially extending slots, and windings which may comprise a plurality of coils formed by multiple turns of a conductor. The multiple winding turns have side turn portions which are disposed within the axial extending slots and end turn portions which project from the slots and which are disposed about end faces of the core. The windings may be electrically connected to each other and/or to external power conductor leads in various configurations depending on, for example, whether the windings are connected in parallel or in series, the number of windings, etc., with the interconnections being made by any suitable technique such as brazing, soldering, or crimping, to name a few. Connections or connection points resulting from the electrical interconnections are electrically insulated and generally disposed within or about the end turns of the windings.

In Miller application Ser. No. 844,915 filed Oct. 25, 1977, which issued Aug. 5, 1980 as U.S. Pat. No. 4,215,464 assigned to the assignee of the present invention, and the entire disclosure of which is hereby incorporated herein by reference; new and improved stator connection assemblies and methods of making the same are disclosed, among other things. For example, connection insulators are disclosed having a plurality of insulating compartments or holsters for electrically isolating connections or connection points resulting from the electrical connection of windings of a stator assembly to each other and/or to external power conductor leads. The connection insulator is secured to the outer periphery of winding end turns which eliminates cut-through problems caused by embedding connection insulators within winding end turns.

Multipocketed insulators may encounter some cut-through problems even if not embedded within winding end turns of stator assemblies although the problems may occur less frequently. For example, burrs or sharp edges of connection points may damage the insulating material establishing the pockets during insertion of the connections; or high resistance connections may result in elevated temperatures and resultant burn-through problems. Further, problems may be encountered in maintaining the integrity of pockets in that a pocket may be distorted when a connection involving several wires is inserted into the pocket. However, fabrication of connection insulators from a material less susceptible to cut-through, burn-through, and distortion may cause subsequent mounting problems and/or increase fabrication problems. Thus, it would be desirable to develop solutions which would alleviate or minimize these problems without creating mounting or fabrication problems.

Although use of multipocketed connection insulators may produce many benefits such as a reduction in steps required to isolate multiple electrical connections, difficulties in fabricating connection insulators with multiple insulating pockets or compartments may offset many of the benefits derived as a result of their use. For example, fabrication processes for multipocket insulators often require multihandling and manipulation of discrete pieces of material at operating stations where different process steps are performed. The multihandling of pieces of material or materials often constitutes significant portions of the time and the expense involved in the fabrication process.

Accordingly, a general object of the present invention is to provide new and improved methods for fabricating connection insulators.

Another object of the present invention is to provide new and improved methods of fabricating multicompartment connection insulators which minimize fabrication steps and material handling.

Still another object of the present invention is to provide new and improved methods of fabricating multicompartment connection insulators from strips of material of indeterminate length; and which minimize scrap material.

A further object of the present invention is to provide new and improved apparatus and methods for substantially closing at least one insulating compartment of a multicompartment connection insulator.

SUMMARY OF THE INVENTION

Methods and apparatus are disclosed for fabricating connection insulators having a plurality of insulating compartments for electrically isolating electrical connections. One method that exemplifies the invention in one preferred form involves supplying a first strip of insulating material at a predetermined average rate of supply to a securing station, supplying a second strip of insulating material at a predetermined average rate of supply greater than the predetermined average rate of supply of the first strip to a forming station and enhancing the pliability of the second strip for aiding the deformability characteristics of the second strip, and deforming the second strip of insulating material into predetermined patterns. The one preferred method further involves moving the second strip of insulating material into position adjacent to the first strip of insulating material at the securing station, securing together the two strips of insulating material and thereby establishing a plurality of insulating compartments bounded by the first and second strips of insulating material, advancing and positioning the two insulating strips at a cutting station, and severing the two insulating strips for establishing a connection insulation having a plurality of insulating compartments or pockets.

Another preferred method of practicing the present invention includes heating a second strip of insulating material for enhancing its pliability and moving the second strip to a deforming station for establishing a corrugated configuration therein, and ultrasonically welding the second strip to a first strip of insulating material and thereby establishing a plurality of insulating compartments.

Still another preferred method of practicing the present invention includes establishing a plurality of insulating compartments by securing together a first strip or sheet of insulating material and a second strip or sheet of insulating material, and then substantially closing one end of at least one of the insulating compartments by reconfiguring one of the strips of insulating material.

One novel form of illustrated apparatus which exemplifies the invention in one preferred form and which may also be used to carry out above-described methods of the invention, includes a forming station, a securing station and a cutting station. Base supply means supplies a first strip of insulating material at a predetermined average rate of supply to the securing station, and retaining supply means supplies a second strip of insulating material to the forming station at a predetermined average rate of supply greater than the predetermined average rate of supply of the first strip of insulating material. Means for enhancing the pliability of the second strip of insulating material is employed to increase the deformability characteristic of the second strip. At the forming station, deforming means including a first track assembly and a second track assembly deforms the second strip of insulating material into a predetermined pattern. At the securing station, securing means secures together the first strip of insulating material to the second strip of insulating material and thereby establishes a plurality of insulating compartments bounded by the first strip of material and the second strip of material for subsequently isolating electrical connections. Means for severing is provided at the cutting station to sever the two strips of material for establishing a connection insulator having a plurality of insulating compartments.

The apparatus illustrating the invention in its preferred form includes a heating device for enhancing the pliability of a second strip of material by increasing the temperature of the strip, deforming means for deforming the second strip into a corrugated configuration, and an ultrasonic welding device for securing together the first strip of material and a second strip of material thereby establishing a plurality of insulating compartments or pockets.

Another aspect of the present invention is a deforming means which in one disclosed form includes first and second tracks having arbors and anvils, respectively, which intermesh during movement of the tracks to entrap and deform a strip of insulating material into a corrugated configuration.

In accordance with another aspect of the invention, the illustrated apparatus includes closing means for reconfiguring one strip of insulating material for substantially closing at least one insulating compartment of a multicompartment connection insulator established by two strips of insulating material.

Yet another aspect of the present invention includes an improved connection insulator having a plurality of insulating compartments. In one preferred form, the connection insulator is provided with a base portion of a polyester material, and a retaining portion formed of a laminated material comprising at least one layer of polyester material and at least one layer of insulating paper.

BRIEF DESCRIPTION OF THE DRAWINGS

Other objects of the present invention and their attendant advantages, will become readily apparent from the following description taken in conjunction with the accompanying figures in which like reference numbers are used to describe like parts throughout the several views, wherein:

FIG. 3 is a broken plan view of the track assemblies of FIG. 2 illustrating the movement of arbors of the first track assembly into and out of the path of the second strip of material;

FIG. 5 is a perspective view of an improved connection insulator produced by practicing one form of the invention;

FIG. 6 is a perspective view of the reverse side of the connection insulator of FIG. 5 illustrating ultrasonic welds;

FIG. 7 is a perspective view of an improved connection insulator produced by practicing another form of the invention, illustrating three insulating compartments with ends thereof substantially closed;

FIG. 10 is a perspective view of a manually operated closer;

FIGS. 11-13 are perspective views of the manually operated closer of FIG. 10 illustrating operation of the closer for reconfiguring portions of a connection insulator;

FIG. 17 is a plan view of a modified cutting mechanism and an automatic pocket closer incorporated at a cutting station.

DESCRIPTION OF THE PREFERRED EMBODIMENTS

Figure 1:
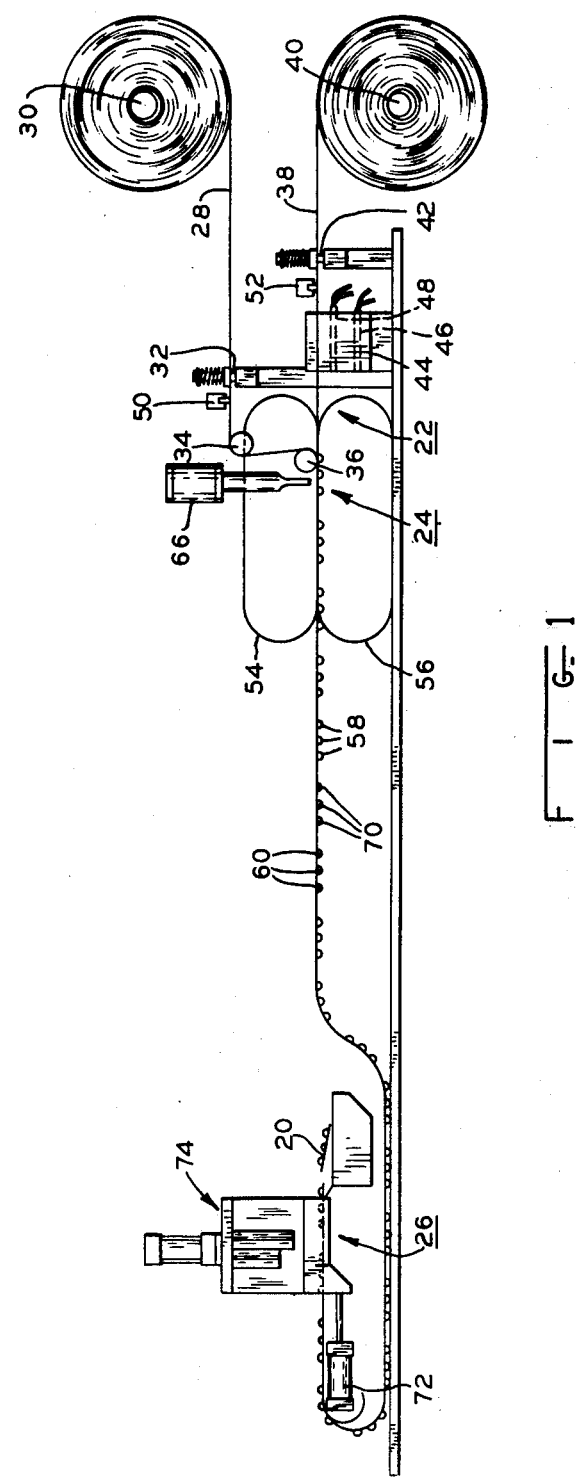
FIG. 1 is a schematic representation of one preferred form of the invention being practiced when fabricating connection insulators having a plurality of insulating compartments.

One preferred form of the invention may be practiced when fabricating connection insulators such as connection insulator 20 illustrated in FIGS. 5 and 6; and this is depicted schematically in FIG. 1. FIG. 1 illustrates process steps being performed at a forming station 22, a securing station 24 and a cutting station 26. In carrying out the process, a first strip or sheet 28 of a first insulating material 11, which is formed from a deformable, electrical insulating material such as a polyester material, for example, the material marketed under the trademark "MELINEX" by Imperial Chemical Industries having offices in Wilmington, Delaware, is supplied at a predetermined average rate of supply such as, for example, approximately 0.625 inches per 1.9 seconds to the securing station. Supplying the first strip is accomplished by a base supply means shown as including feed reel or spool 30, tension device 32 and guide rolls 34 and 36. A second strip or sheet 38 of insulating material is supplied to the forming station. The second strip in a preferred form is an insulating material having sufficient strength and capable of withstanding elevated temperature so as to minimize problems of cut-through and burn-through and yet, may be readily fabricated and assembled. For example, a laminated material formed with at least one layer of a polyester material and at least one layer of an insulating paper, for example, a sandwich arrangement of MYLAR, NOMEX, MYLAR materials as marketed by E. I. DuPont de Nemours and Company under those names. The second strip of insulating material is supplied to the forming station 22 by retaining supply means shown as including feed reel or spool 40 and tension device 42 with the predetermined average rate of supply being greater than the predetermined average rate of supply of the first insulating material such as, for example, approximately 1.16 inches per 1.9 seconds. While enroute to the forming station, the pliability of the second strip of insulating material is enhanced to aid its deformability characteristics. Means for enhancing pliability is illustrated as heating device 44 including thermostat 96 and resistance heating element 40 for heating the second strip of insulating material to a higher temperature such as, for example, approximately 150° C. Electrical power to the resistance heating element is removed by thermostat 46 if an excessive temperature is reached, for example 250° C., or by operation of either limit switch 50 or limit switch 52 which contact the first and second strips, respectively to insure that both strips are actually being supplied.

At the forming station 22, the second strip of insulating material 38 is deformed to establish a predetermined pattern by deforming means illustrated in FIG. 1 as a first track assembly 54 and a second track assembly 56 which deform the second strip into the illustrated corrugated configuration comprising a plurality of webs 58 and compartment establishing portions or interior surfaces 60. The track assemblies are driven intermittently by a motor 62 and cam drive 64 (FIG. 4), thus the second strip of insulating material intermittently dwells and advances along the track assemblies to the securing station 24 and into position adjacent to the first strip 28 of insulating material. The two strips are secured together at the securing station by a securing means illustrated as an ultrasonic welding device 66 with the welding device being moved into engagement with first strip 28 during a dwell in movement of the track assemblies for establishing two welds 68 (FIG. 6), and then being moved away from the strip before the track assemblies recommence advancing the strips. The two welds are established at approximately equally spaced intervals along the adjacent strips or sheets and thereby secures the two materials together for establishing insulating compartments or pockets 70 bounded by the first strip of material and the second strip of material. When the strips are formed from a polyester material and a laminated material as discussed hereinabove, the welds secure the strips by fusing the first strip of polyester material to one of the layers of polyester material of the second strip. After the welds, and thus the insulating compartments, have been established the track assemblies transmit driving forces through the second strip of material to the first strip of material for advancing the first strip simultaneously with the second strip. The intermittently moving track assemblies pull the second strip of material from the spool 40 and advance it along the assemblies at a cyclical variable feed rate and after the two strips are secured, the driving forces are transmitted from the track assembly through the second strip to pull the first strip of material from spool 30 and advance it along the track assemblies at an average rate less than that of the cyclically variable feed rate because a greater length of the second strip is employed in establishing the webs 58.

After being secured together, the first strip 28 of insulating material and the second strip 38 of insulating material are advanced and positioned at the cutting station 28 by an advancing means shown as feed cylinder 72. A cutting mechanism 74 severs the secured together first and second strips, and thereby establishes a connection insulator such as connection insulator 20 (FIGS. 5 and 6) having plurality of insulating compartments or pockets 70.

Figure 2:
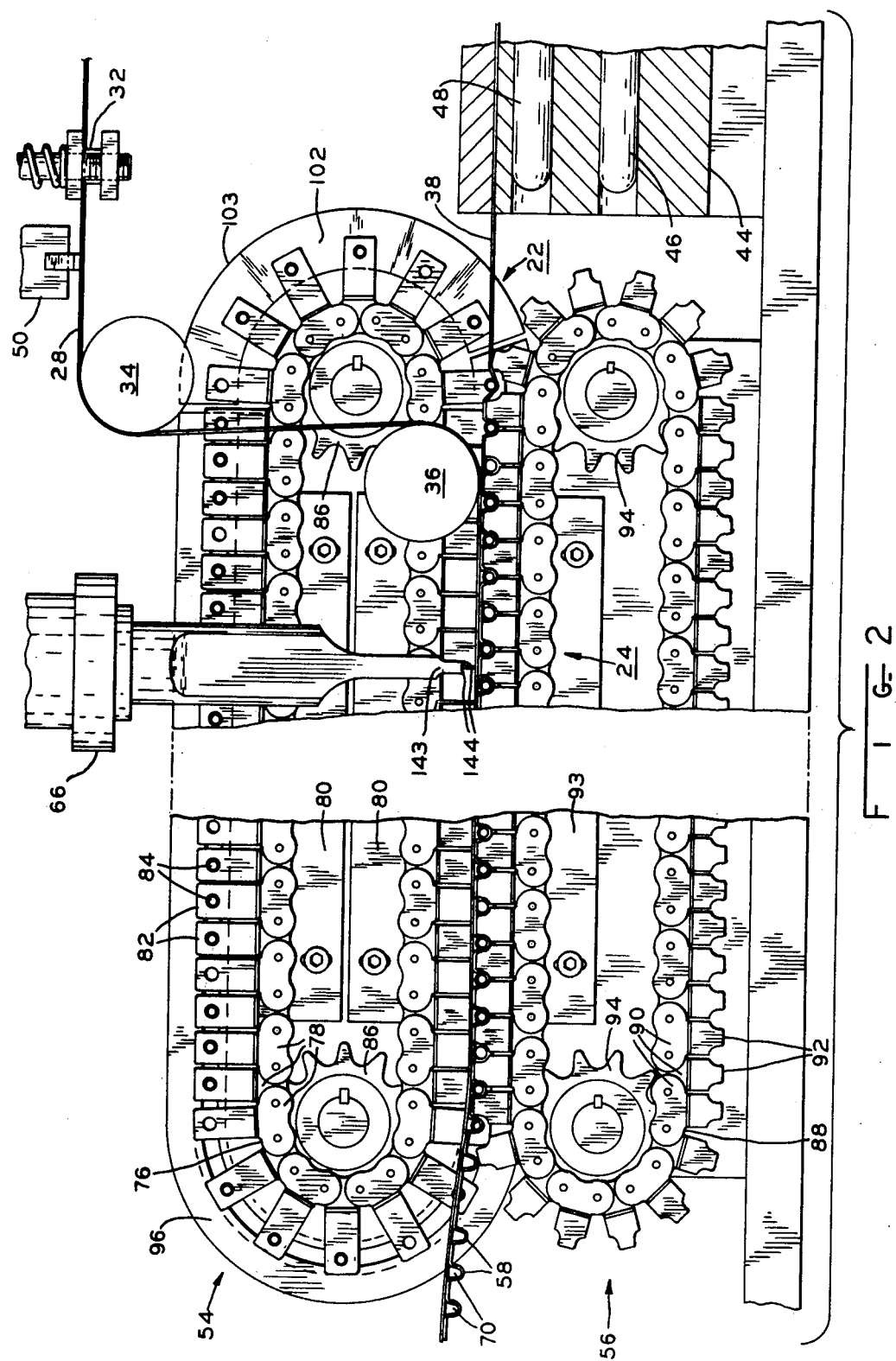
FIG. 2 is a broken front elevational view of first and second track assemblies and an ultrasonic welding device illustrating the deforming of a second strip of material and the securing of the second strip to a first strip of material.
Figure 4:
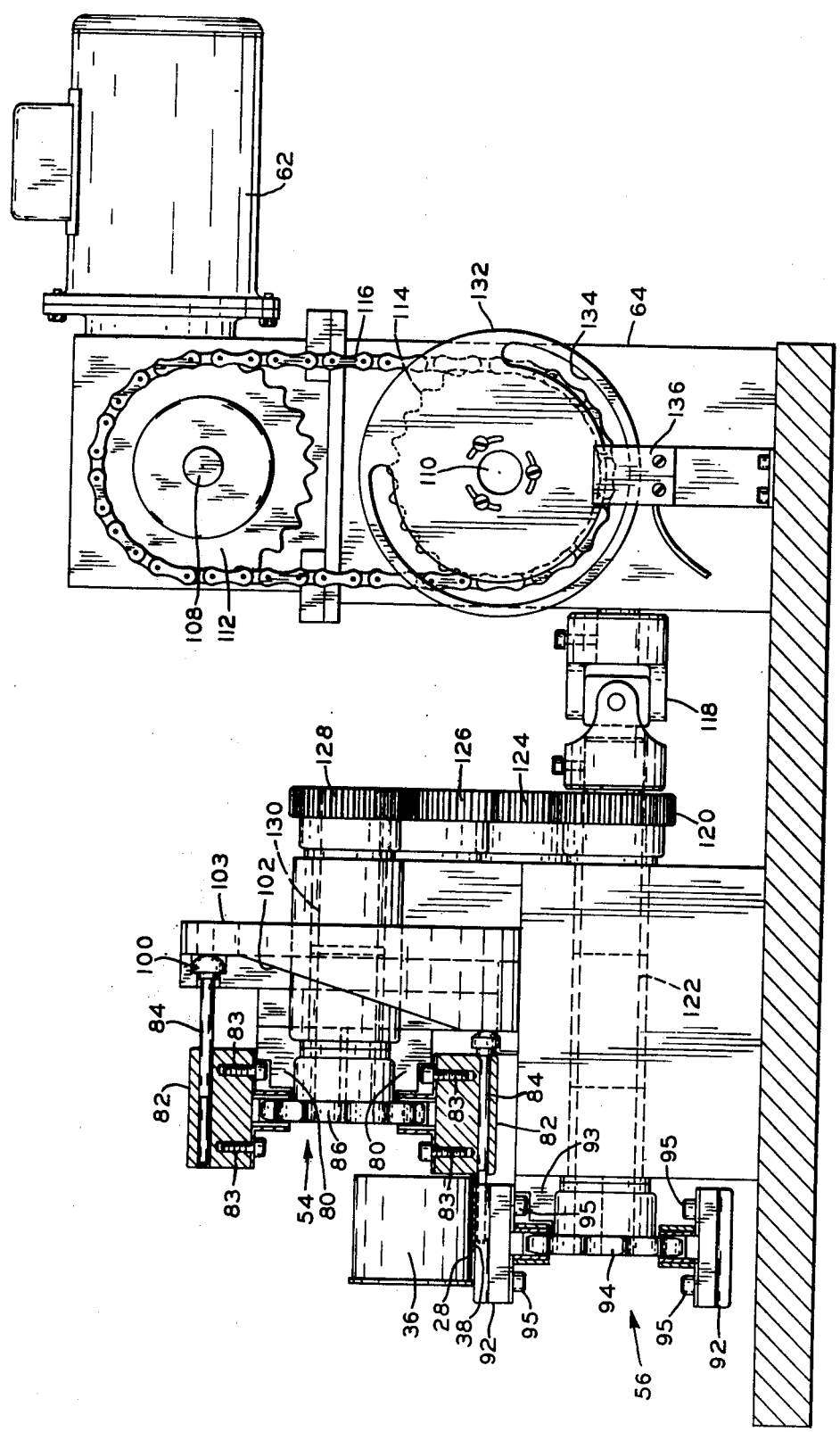
FIG. 4 is a side elevational view of the first and second track assemblies of FIGS. 2 and 3 illustrating the interconnection of the assemblies with a drive motor and cam drive also illustrating a switch arrangement for converting mechanical motion of the cam drive into an electrical signal.

FIGS. 2–4 illustrate further details of the first and second track assemblies, 54 and 56, respectively, which extend from the forming station 22 to the securing station 24, and are utilized to establish the insulating compartments 70.

Referring to FIG. 2, the first track assembly includes a roller chain 76 established by connected links 78, two support blocks 80 for supporting and guiding the roller chain during movement, pin blocks 82 attached to the roller chain by bolts 83 (FIG. 4), and arbors or pins 84 slideably mounted within the pin blocks. Two gears 86 engage the roller chain for causing movement of the chain, and thus, movement of the pin blocks and arbors. The second track assembly 56 includes a roller chain 88 established by connected links 90, anvils 92 attached to the roller chain by bolts 95 (FIG. 4), and one support block 93 for supporting and guiding the roller chain during movement. Two gears 94 engage the roller chain 88 for causing movement of the chain, and thus, movement of the anvils.

As mentioned previously, the pins or arbors 84 are slideably mounted within the pin blocks 82. Means are provided for moving the pins into and out of the path of the second strip of insulating material 38. In FIG. 3, one means for moving the pins is shown as cam device 96 extending about a portion of the periphery of the first track assembly and with a channel 98 within and extending part of the way around the device for controlling the location of the heads 100 of the pins 84. Cam surface 104 of the cam device is a means for retracting the pins and thus, moving the pins laterally or transversely away from the paths of the strips, 28 and 38. Cam surface 102 (also see FIG. 4) of end cam plates 103 provides means for extending the pins into the path of the second strip of insulating material for deforming the strip.

As best shown in FIG. 3, the pins or arbors 84 are mounted within their respective pin blocks 82 in groups of three, and each such group of three is separated from another such group of three by a pin block without a pin therein. The omission of a pin is preferred over pins in every pin block for producing connection insulators because it has been found that the unformed material at the sides of each group of three pockets which results from such omission facilitates subsequent mounting of connection insulators in stator assemblies. Thus it will be understood by persons skilled in the art that the illustrated three pin grouping arrangement is used for producing connection insulators having three insulating compartments or pockets. However, if a connection insulator having four pockets were desired, the pins would then be rearranged in groups of four, and a pin would be omitted from the pin blocks separating each group.

The pins 84 are accessible for removal and rearrangement when they are within the region of the end cam plate 103. The track assembly can be set up to fabricate connection insulators with different numbers of insulating pockets with the rearrangement of pins by providing the assembly with a number of pin blocks which is divisible evenly by the number of pockets desired plus one (for the omitted pin). For example, if three and four pocket insulators were to be fabricated, sixty pin blocks could be provided because sixty is divisible evenly by four and five. Referring to FIG. 2, additional pin blocks may be added to the first track assembly 54 to provide flexibility in fabricating insulators with different numbers of pockets by changing the spacing between the two gears 86 and the length of roller chain 76, accordingly. Alternatively, an adjustable idler sprocket could be provided which could be adjusted to establish a longer or shorter path for longer or shorter chains having different total numbers of links.

FIG. 4 illustrates further details of the first and second track assemblies, 54 and 56, respectively and details of means for driving the two assemblies. As mentioned previously, the cam surface 102 of cam end plate 103 causes extension of the pins 86 (i.e., transverse movement as viewed in FIG. 4) so that the pins engage the second strip of insulating material 38 and intermesh with the anvils 92 of the second track assembly (see FIG. 2). Means for moving or driving the two track assemblies is provided which includes motor 62 and cam drive 64. The motor runs continuously during the fabrication process; however, the cam drive 64, which may be for example a model 12-FM62-90 made by Ferguson Machine Company, provides only 90 degree intermittent mechanical output movement per 360 degree movement of the motor. The motor is connected to the cam drive by way of shafts 108 and 110, sprockets 112 and 114, and chain 116. The cam drive is, in turn, connected by way of U-joint or coupler arrangement 113, gear 120 and shaft 122 to one of the sprockets 94 for intermittently driving the second track assembly 56. The rotation of gear 120 also causes movement of the first track assembly 54 at the same speed because of its interconnection with one of the sprockets 86 by way of gears 124, 126, 128 and shaft 130.

Also illustrated in FIG. 4 is means for sensing and converting the intermittent output movement produced by the cam drive 64 into an electrical signal. The means for sensing and converting is shown as including a circular plate 132 attached to cam drive shaft 110 and having a slot 134 therein, and further including proximity switch 136 which is deactuated as the slot passes within the switch. The illustrated slot extends 270 degrees, and thus, the switch is actuated for 90 degrees or for 25 percent of the rotation of the motor 62. The sensing and connecting arrangement is employed as a means for synchronizing the intermittent movement of the track assemblies with the welding of the strips of material as discussed more fully hereinbelow.

Figure 8:
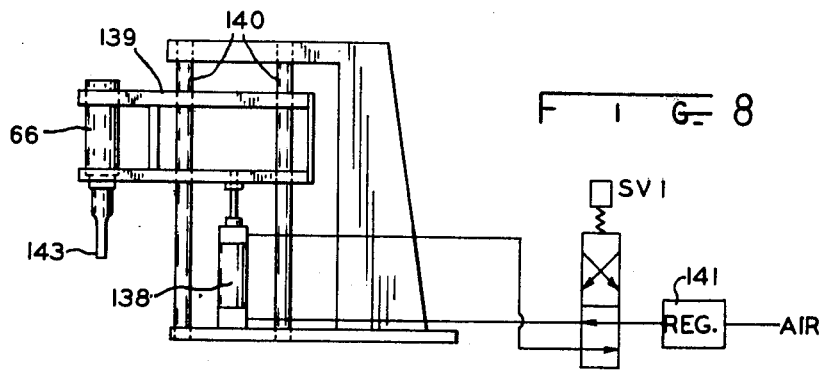
FIG. 8 is a side elevational view of an ultrasonic welding device and mounting arrangement for fusing strips of insulating material.

FIGS. 2 and 8 illustrate the ultrasonic welding device 66 which provides means for securing together the first strip 28 of insulating material and the second strip 38 of insulating material at the securing station 24. The art of ultrasonically welding has previously been developed and is represented, for example, by patents such as U.S. Pat. Nos. 3,224,916; 3,367,809; and 3,499,808; the disclosures of all of which are incorporated herein by reference. As illustrated in FIG. 8, the ultrasonic welding device 66 is connected to cylinder 138 by a mounting fixture 139 which is slideably mounted on guides 140. Air is supplied to the cylinder through air regulator 141 (which controls the welding pressure and which may be set, for example, at 55 psi) and through solenoid SV-1 which controls the direction of movement of the cylinder. Energization of solenoid SV-1 causes cylinder 138 to move the mounting fixture 139 downward along the guides 140. Welding tip 143 thereupon engages the first strip 28 adjacent to the second strip 38, which is positioned over one of the anvils 92 (shown in FIG. 2). The welding tip 143, which may be made from titanium alloys, is provided with two engaging surfaces 144 (FIG. 2), and thus two welds 68 (FIG. 6) are produced simultaneously.

Referring to FIGS. 1-4, operation of the first and second track assemblies, 54 and 56, respectively, and the welding device 66 will now be explained. The first strip 28 of insulating material is supplied from spool 30 to the securing station 24 and the second strip 38 of insulating material is supplied from spool 40 to the forming station 22. Operation of the motor 62 causes the cam drive 64 to intermittently drive the two track assemblies. The pins 84 of the first track assembly are in a retracted position as they move across the path of the first strip 28. However, the cam surface 102 of the cam end plate 103 causes extension of the pins as they are advanced into the path of the second strip 38. At the forming station 22, the pins intermesh with their respective anvils 92 and thereby entrap and deform the second strip into a corrugated configuration having the webs 58. The track assemblies intermittently advance the second strip 38 toward the securing station 24 where the strip 38 is in position adjacent to the first strip 28. The proximity switch 136 senses the intermittent output movement of the cam drive and thus, the intermittent movement of the track assemblies by use of the slotted cam 134.

Figure 9:
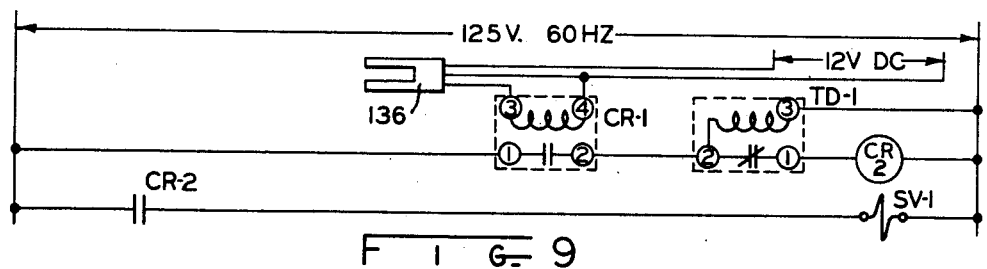
FIG. 9 is an electrical schematic, illustrating an electrical connection arrangement for operation of the welding device of FIG. 8.

Referring briefly to FIGS. 8 and 9, the proximity switch 136 which is supplied with power from a 12 volt DC source operates to energize relay CR-1 during a dwell in movement of the track assemblies. A normally open contact of CR-1 which is connected in series with a time delay relay TD-1 and control relay CR-2 closes when CR-1 is energized and thus causes energization of TD-1 and CR-2. CR-2, when energized, closes its normally open contacts connected in series with SV-1 causing energization of SV-1 which supplies air to the cylinder 138 for moving the welding device 66 downward to engage the first strip 28 of insulating material (FIG. 2). The welding device remains engaged with the first strip until the time delay TD-1 times out causing its contact, connected in series with CR-2, to open which deenergizes CR-2 causing SV-1 to deenergize. The deenergization of the solenoid causes the cylinder 138 to extend and thereby move the welding device away from the strips.

Referring back to FIGS. 1-4, the track assemblies 54 and 56 advance as the welder 66 moves away from the strips 28 and 38. The securing of the two strips causes forces to be transmitted from the second track assembly through the first strip 28, and thereby causes advancement of the first strip 28 simultaneously with the second strip 38. The welding device is operated during each dwell in movement of the track assemblies to establish welds spaced approximately equal distances along the strips, thus establishing welds between each of the webs 58. The welds establish the insulating compartments or pockets 70 which are bounded by the first strip 28 and the second strip 38. As the strips are advanced along the track assemblies away from the securing station 22, the pins 86 of the first track assembly are retracted from the pockets 70 by the cam surface 104, thus allowing the strips to move to the cutting station 26.

Referring to FIG. 1, the secured together first strip 28 and second strip 38, which mutually establish compartments or pockets 70, are advanced to the cutting station 26 and positioned by the feed cylinder 72 relative to the cutting mechanism 74 which provides a means of severing the two strips. The cutting mechanism, which will be discussed in more detail hereinbelow, operates to sever the two secured together strips, and thus, establishes the connection insulator 20.

FIGS. 5 and 6 better illustrate the connection insulator 20 upon leaving the cutting station. The connection insulation has a base portion 158 established by a piece of the first strip of insulating material and a retaining portion 160 established by a piece of the second strip of insulating material. The base portion includes a tab 162 having the two tapered sides 164 to facilitate subsequent mounting in a stator assembly. The base portion was severed simultaneously with the severing of the two secured together strips at the cutting station to establish the tapered sides. The retaining portion having the webs 58 and the base portion 158 are secured together by the welds 68.

In order to provide better electrical isolation of electrical connections which are to be subsequently inserted into the insulating compartments, it is preferred to substantially close one end of the compartments into which connections are to be inserted. FIG. 7 illustrates a connection insulator 166 identical to connection insulator 20 of FIG. 5, except with sections 168 of the retaining portion 160 reconfigured to establish substantially closed insulating compartments or pockets 70. It is in particular, preferred not to close the pockets entirely if the connection insulator is to be installed in a stator assembly which is subjected to a varnish treat or dipping process in order to prevent retention of liquid during the dipping process.

One means for reconfiguring a connection insulator for substantially closing one end of each of the compartments is a manually operated closer 170 illustrated in FIGS. 10-13. As shown in FIG. 10, the manually operated closer is provided with four pocket support pins 172 for supporting the insulating pockets or compartments during the reconfiguring operation and four reconfiguring pins 174 attached on pivotally mounted member 176. The four pocket support pins and four reconfiguring pins are provided so that as many as four substantially closed pockets can be established simultaneously with the manually operated closer. A spring loaded ejector pin 178 attached to push member 180 and slideably mounted with pocket support pin mounting block 182 is provided for engaging the base portion of a connection insulator and ejecting the connection insulator from the manually operated closer after the retaining portion has been reconfigured to substantially close the ends of the pockets.

FIGS. 11-13 illustrate the operation of the manually operated closer 170. As shown in FIG. 11, a connection insulator shown such as connection insulator 20 (also see FIGS. 5 and 6) is placed in the closer with the pocket support pins extending into one end of each insulating compartment or pocket 70 (FIGS. 5 and 6) and with the tab portion 162 of the connection insulator moving into a recess 184 of the pocket support pin mounting member 182. The reconfiguring pins 174 are then moved in an arcuate path by pivoting the pivotally mounted member 176 about pivot line 186 (FIG. 10) using handle 188. The manually operated closer is moved to the position illustrated in FIG. 12 causing the reconfiguring pins 174 to engage the retaining portion 160 of the insulator and establish the reconfigured sections 168 (shown more clearly in FIG. 7), and thereby substantially close one end of the pockets 70 (FIG. 7). The reconfiguring pins 174 are then moved or pivoted back to the position as shown in FIG. 13. The ejector pin 178 is then moved by compression of spring 190 by moving the push member 180 to the position as shown causing the ejector pin to engage the tab portion 162 of the connection insulator for pushing or ejecting the connection insulator from the manually operated closer. Upon ejection from the closer, the connection insulator is in the form illustrated as connection insulator 166 in FIG. 7.

Figure 14:
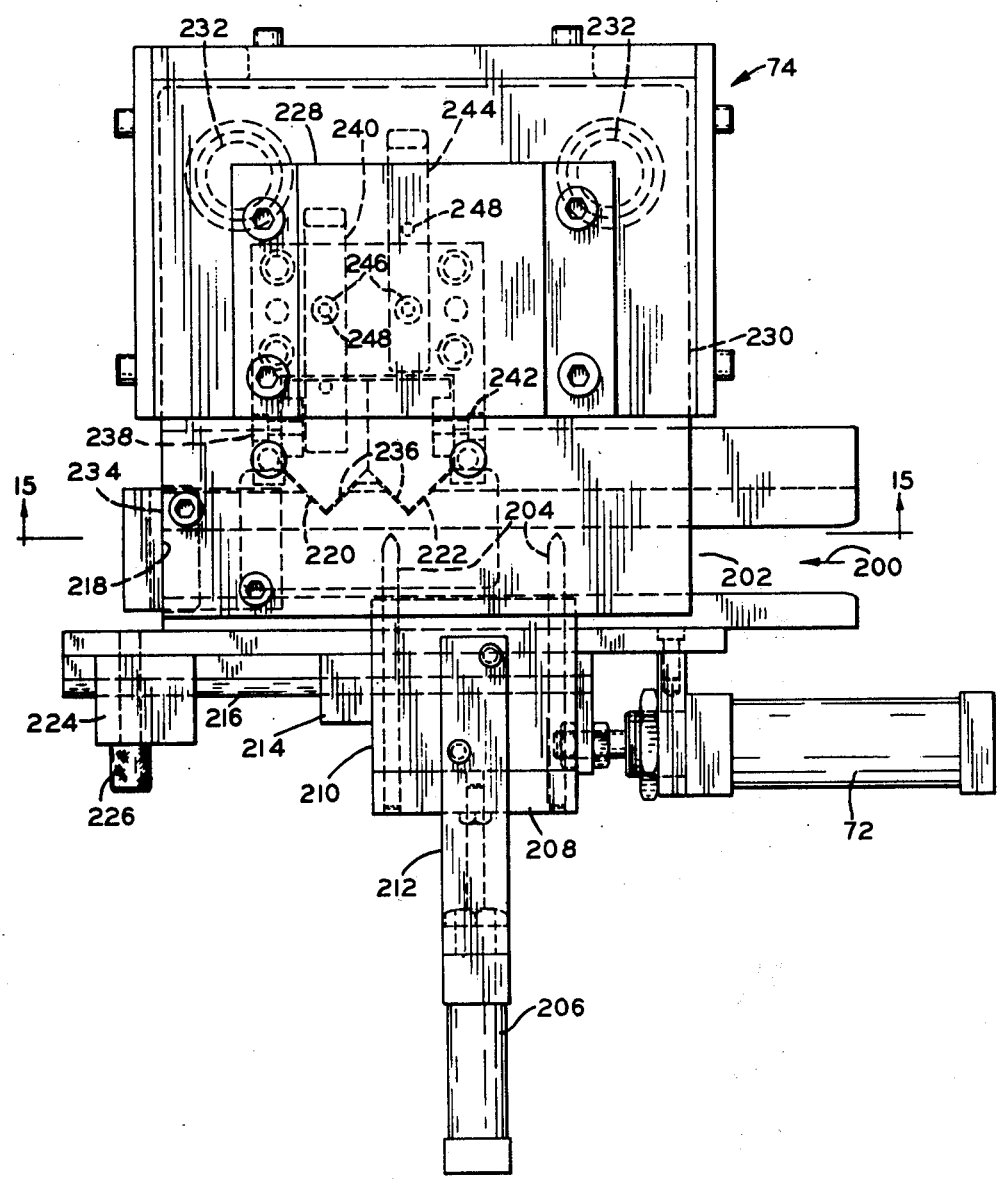
FIG. 14 is a plan view of a cutting mechanism for severing strips of material to establish connection insulators.
Figure 15:
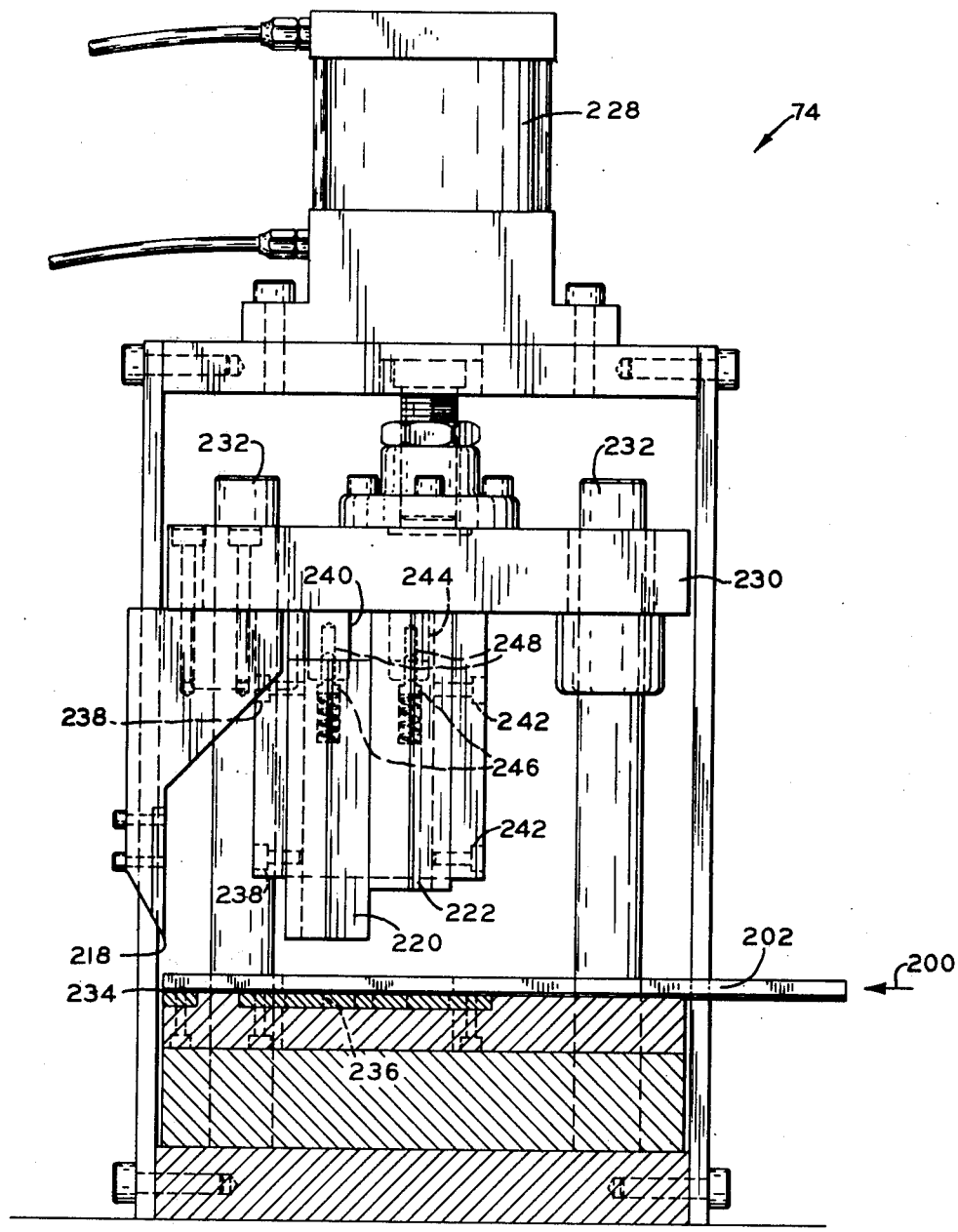
FIG. 15 is a cross-sectional view of the cutting mechanism of FIG. 14 illustrating further details.

FIGS. 14-15 illustrate further details of the cutting mechanism 74 which provides a means of severing the first strip 28 of insulating material and second strip 38 (FIG. 1) of insulating material at the cutting station 26 (FIG. 1). As best illustrated in FIG. 14, the strips are fed into the mechanism in a direction as indicated by arrow 200 with the first strip contacting and moving along feed channel 202. Two grasping pins 204 connected for movement by grasping cylinder 206 are provided for moving transversely relative to the incoming strips so that the pins extend into the pockets 70 (FIG. 1). The pins are attached to the grasping cylinder by mounting plate 208 and are slideably mounted within guide block 210 having the grasping cylinder support 212 attached thereto. The guide block 210 is attached to slide plate 214 which is movable along slide 216 and which is also connected to the feed cylinder 72. Thus, extension of the feed cylinder after the grasping pins have been extended into the pockets, advances and positions the incoming strips relative to cutting blades 218, 220 and 222. The stroke of the feed cylinder is controlled by stop block 224 which is secured to the slide 216 by removable pin 226.

With specific reference to FIG. 15, after the feed cylinder has been extended to advance and position the strips relative to the cutting blades 218, 220 and 222, blade cylinder 228 is extended to move blade mounting plate 230 having the blades attached thereto downward along guides 232. The blade 218 engages and severs the strips along shearing surface 234. Substantially simultaneously with the shearing of the strips, blade 220 engages and cuts or shears a V-notch shaped section out of the first strip of insulating material at shearing surface 236. Referring briefly to FIG. 5, the cutting of the V-notch shaped section would establish one of the tapered sides 164 for each of two different connection insulators to be subsequently severed.

Referring again to FIGS. 14 and 15, the cutting mechanism 74 is shown as being set-up to establish connection insulators having three insulating compartments or pockets 70 (FIG. 5). However, with reference to FIG. 14, the illustrated cutting mechanism can be adjusted to sever connection insulators having four pockets by removing the pin 226, rotating the stop block 224 180 degrees annd reinserting the pin, thus changing the stroke of the feed cylinder 72. Further, after loosening screws 238 and sliding detentably engaged force bar 240 away from the blade 220, the blade 220 is moved upward relative to the blade mounting plate 230. The cutting blade 222 is then moved downward after loosening screws 242 and force bar 244 is slideably moved between the blade and the blade mounting plate 230 (see FIG. 15). Spring loaded detent pins 246 are employed to engage recesses 248 in the force bars 240 and 244 when they are positioned over their respective cutting blade. The force bars are positioned over the particular blade performing the cutting operation for preventing upward movement of the blade during the cutting operation.

Figure 16:
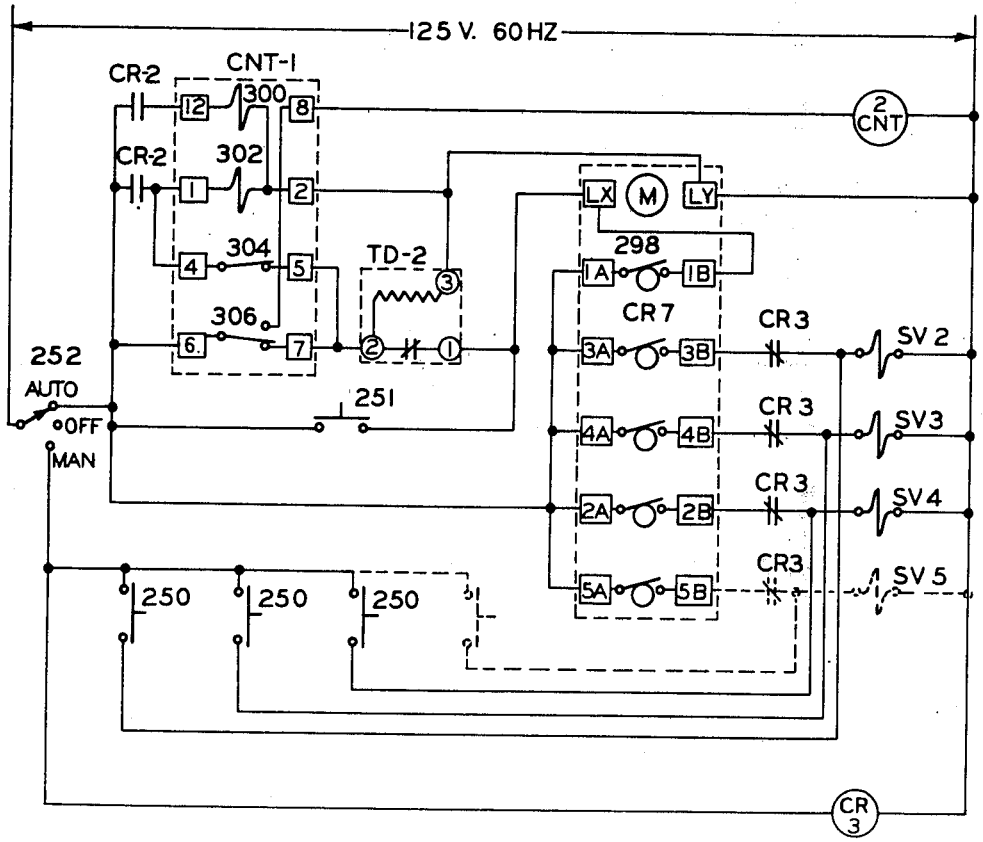
FIG. 16 is an electrical schematic for operating the cutting mechanism of FIGS. 14 and 15.

FIG. 16 illustrates an electrical schematic circuit which is employed in operating the above-described cutting mechanism 74 of FIGS. 14 and 15 with the exception of elements illustrated by dotted lines which will be described hereinbelow.

The illustrated circuit controls the sequence of operation of solenoids SV-2, SV-3 and SV-4 which are employed to actuate the feed cylinder 72, the blade cylinder 228, and the grasp cylinder 206 (FIGS. 14 and 15), respectively. As mentioned previously, the proximity switch 136 shown in FIG. 9 signals movement of the two track assemblies, 54 and 56 (FIG. 2) for initiating the welding or securing together of the strip material during a dwell in movement of the track assemblies by causing energization of CR-2 as illustrated in FIG. 9. Each energization of CR-2 and thus each welding operation is also employed in the circuit shown in FIG. 16 to control the sequence of operation of the cutting mechanism. Contacts of CR-2 are connected in series with counter CNT-1 for counting the number of welding operations being performed by welding device 66 (FIG. 2) and after a predetermined number of welding operations have been performed, the time delay TD-2 connected to contacts of CNT-1 is energized which in turn causes energization of cam relay CR-7 having programmable contacts in series with each of the solenoids SV-2, SV-3 and SV-4 for controlling their operation and a contact 298 for maintaining power on its motor after TD-2 timed out. CNT-1 has an automatic reset, count solenoid 300, motor 302, contacts 304 opened at the end of counting and contacts 306 actuated during counter reset.

Referring to FIGS. 6 and 14–16, four operations of welding device 66 (FIG. 2) are required to establish the ultrasonic welds 68 for the three pocket connection insulators 20 (FIG. 6). Thus, the counter CNT-1 is set to count four welding operations by way of CR-2 contacts whereupon the counter causes energization of TD-2 and motor of cam relay CR-7. CR-7 contacts are programmed to energize SV-4 to cause operation of the grasp cylinder 206 for moving the grasp pin 204 into two of the pockets 70 along the two strips 28 and 38 (FIG. 2). With the grasp pins extended, the feed solenoid SV-2 is energized to cause actuation of the feed cylinder 72 which extends to move and position the strips relative to the cutting blades 218 and 220. The punch or cutting solenoid SV-3 is then energized causing operation of the blade cylinder 228 for severing the strips and establishing the tapered sides 164 (FIG. 5) of connection insulators to be subsequently severed. The cam relay CR-7 causes retraction of the feed cylinder 72 with the grasp pins 204 retracted through deenergization of SV-2 and SV-4. The blades remain in the down position by continued energization of SV-3 until the grasp pins have again been extended in order to prevent movement of the strips.

Referring to FIG. 16, three manually operated pushbuttons 250 are provided for manually operating the solenoids SV-2, SV-3 and SV-4 when the selector switch 252 is in the "MAN" position and control relay CR-3 is provided with normally closed contacts in series with each of the solenoids for disconnecting the solenoids from the remaining circuit when the selector switch is in "MAN". Manually operated pushbutton 251 is also provided to manually energize the cam relay CR-7 for advancing the strips through the cutter mechanism. CNT-2 is also provided to count the total number of connection insulators produced with the counter being operated from the contacts 306 of CNT-1 each time CNT-1 counts its predetermined number of counts or welding operations.

In order to produce connection insulators such as connection insulator 166 illustrated in FIG. 7 having the reconfigured section 168 for substantially closing the pockets 70, it is believed to be desirable to provide a means for automatically reconfiguring the retaining portion 160 simultaneously with the severing of the strips at a cutting station. FIG. 17 illustrates an automatic closer 254 mounted with a cutting mechanism 256 substantially similar to the mechanism 74 illustrated and discussed hereinabove in reference to FIGS. 14 and 15. The closer 254 is provided with pocket support pins 258 attached to pin block 260 for movement of the pins by cylinder 262 into the pockets 70 (FIG. 2). Reconfiguring pins 264 attached to mounting block 266 are provided with the mounting block attached to member 268 for pivoting the pins in an arcuate path about pivot pin 270.

The mounting block 266 is connected by way of a not-shown linkage to a blade mounting plate of the cutting mechanism 256 which is substantially identical to the blade mounting plate 230 (FIG. 15) for moving the mounting block simultaneously with the severing operation of the cutting mechanism.

In operation of the automatic closer 254, the cylinder 262 is extended moving the pocket support pins 258 into the insulating pockets 70 (FIG. 2) for supporting the pockets and thereby preventing deformation of the pockets during the reconfiguring operation. The reconfiguring pins 264 are then pivoted in an arcuate path by moving the mounting block 266 simultaneously with the severing operation of the cutting mechanism 256 and thus, pivoting the reconfiguring pins about pivot pin 270. The reconfiguring pins engage and reconfigure the retaining portion 160 (FIG. 7) for establishing reconfigured sections 168 and thereby substantially closing pockets 70 as illustrated in FIG. 7.

A shearing plate 272 having shearing surfaces 274 and 276 therein is also illustrated in FIG. 17 as a means of establishing the tab sides 164 (FIG. 7) while also reducing the insulating material or materials extending laterally or transversely from the outer pockets of an insulator. A cutting blade (not shown) simultaneously severs the strips along the shearing surfaces 274 and 276, thereby removing a section from the strip simultaneously with the establishing of the tapered sides 164 of the tab 162 (FIG. 7).

FIG. 17 also illustrates grasping pins 278 with a mounting arrangement identical to that shown for the grasping pins 204 of FIG. 14 for engaging insulator pockets 70 and advancing the strips 28 and 38 (FIG. 2) when moved by feed cylinder 280.

The electrical circuit illustrated in FIG. 16 with the addition of solenoid SV-5 (shown dotted) can be used for controlling the assembly shown in FIG. 17. The cam relay CR-7 would be programmed to cause the pins 278 to grasp the strips by energizing SV-4 and then energize SV-2 to cause feed cylinder 280 to advance the strips. The support pins 258 would then be moved into the pockets by energizing SV-5 to actuate the cylinder 262. The cutting blade (not shown) and the mounting block 266 would then be moved downward by energizing SV-3 to sever the strips along the shearing surfaces 274 and 276 and simultaneously move the reconfiguring pins 264 downward to reconfigure the second strip 38 (FIG. 2), thereby establishing reconfigured sections 168 as illustrated in FIG. 7.

In an actual reduction to practice of the control circuits illustrated in FIGS. 9 and 16, commercially available components were utilized. More specifically, proximity switch 136 was Dynapar #58A; control relay CR-1 was a Crydom #D1210; time delay relays TD-1 and TD-2 were Crydom #TS2411.5; control relays CR-2 and CR-3 were General Electric Co. #CR2810A14C22; counter CNT-1 was an Eagle Signal Co. #HZ-172-A6; cam control relay CR-7 was an Eagle Signal Co. #HF52A60107E3660; and counter CNT-2 was a Veeder Root Co. #150704.

While the invention has been described in terms of particular embodiments thereof, it should now be apparent that changes may be made without departing from the invention. It is therefore intended by the following claims to cover all such variations which are within the true spirit and scope of this invention.

What we claim as new and desire to secure by Letters Patent of the United States is:

1. A method of fabricating an electrical connection insulator, for a dynamoelectric machine, having a base portion established by a piece of a first sheet of electrical insulating material and a retaining portion established by a piece of a second sheet of electrical insulating material deformed in a predetermined pattern for establishing a plurality of electrical insulating compartments, said method comprising: moving a first sheet of electrical insulating material to a securing station at a first predetermined average rate of supply in a longitudinal direction; moving a second sheet of electrical insulating material to a forming station at a second predetermined average rate of supply greater than the first predetermined average rate of supply of the first sheet of insulating material and from the forming station to the securing station in a longitudinal direction; deforming the second sheet of insulating material in a predetermined pattern of partial compartments at the forming station by means of arbors to form compartment portions connected by webs extending in a direction transverse relative to the longitudinal direction of movement of the second sheet and wherein the deforming of the second sheet occurs while both the first and second sheets are undergoing movement; moving the first sheet of insulating material to a position adjacent the second sheet of insulating material at the securing station; ultrasonically welding the first sheet of insulating material and the second sheet of insulating material and thereby securing together the webs of the first sheet of insulating material and the second sheet of insulating material to thereby establish electrical insulating compartments bounded by a base portion established by the first sheet of insulating material and by a retaining portion established by the compartment portions of the second sheet of the insulating material and also thereby trapping the arbors between the first and second sheets of material in the compartment portions; withdrawing the arbors from the compartment portions by moving the arbors laterally and transversely relative to the longitudinal direction of movement of the secured together first and second sheets of material; advancing and positioning the first sheet of insulating material and second sheet of insulating material at a cutting station; and severing the first sheet of insulating material and the second sheet of insulating material to establish an electrical connection insulator having a plurality of electrical insulating compartments.

2. The method of claim 1 further including the step of reconfiguring at least one of the sheets of insulating material to establish a substantially closed end for at least one compartment.

3. The method of claim 1 further including the step of heating the second sheet of insulating material to facilitate deforming the second sheet at the forming station.

4. The method of claim 1 wherein ultrasonically welding includes welding the first sheet of insulating material and the second sheet of insulating material between each insulating compartment established by the first sheet of insulating material and the second sheet of insulating material.

5. The method of claim 1 wherein severing the first sheet of insulating material and the second sheet of insulating material to establish a connection insulator having a plurality of insulating compartments includes severing a portion of the first sheet of insulating material for facilitating subsequent mounting in a stator assembly.

6. A method of making an electrical connection insulator for a dynamoelectric machine and having a first portion established by a piece of a first sheet of electrical insulating material and a second portion established by a piece of a second sheet of electrical insulating material deformed in a corrugated configuration, for establishing a plurality of electrical insulating compartments, said method comprising: supplying a first sheet of electrical insulating material to a securing station at a predetermined average rate of supply; supplying a second sheet of electrical insulating material to a forming station at a predetermined average rate of supply greater than the predetermined average rate of supply of the first sheet of insulating material and enhancing the pliability of the second sheet of material for aiding the deformability characteristics of the second sheet of insulating material; deforming the second sheet of insulating material into a corrugated configuration at the forming station by means of pins or arbors with resulting corrugation of the second sheet extending transversely relative to the direction of movement of the second sheet, with the following occurring while both the first and second sheets are undergoing movement, and with the pins or arbors becoming trapped between the first and second sheets; moving the first sheet of insulating material adjacent the second sheet of insulating material at the securing station; ultrasonically welding the first sheet of insulating material and the second sheet of insulating material and thereby securing together the first sheet of insulating material and the second sheet of insulating material to thereby establish insulating compartments about the pins or arbors bounded by a first portion formed from the first sheet of insulating material and by a second portion formed from the second sheet of insulating material while it is deformed in the corrugated configuration; withdrawing the pins or arbors from the compartments by moving the pins or arbors laterally and transversely relative to the direction of movement of the secured together first and second sheets; and severing the first sheet of insulating material and the second sheet of insulating material for establishing an electrical connection insulator having a plurality of electrical insulating compartments.

7. The method of claim 6 further including the step of reconfiguring at least one of the sheets of insulating material for establishing a substantially closed end for at least one of the insulating compartments.

8. The method of claim 6 wherein enhancing the pliability of the second sheet of insulating material includes heating and second sheet of insulating material.

9. The method of claim 6 further including the step of reconfiguring one of the sheets of insulating material for establishing a substantially closed end for at least one of the insulating compartments.

10. The method of claim 6 wherein enhancing the pliability of the second sheet of insulating material includes heating the second sheet of insulating material.

11. A method of fabricating an electrical connection insulator having a base portion established by a piece of a first strip of electrical insulating material and a retaining portion established by a piece of a second strip of electrical insulating material deformed in a predetermined pattern for establishing a plurality of electrical insulating compartments, said method comprising: supplying a first strip of electrical insulating material to a securing station of a predetermined average rate of supply; supplying a second strip of electrical insulating material to the securing station of a predetermined average rate greater than the predetermined average rate of supply of the first strip of insulating material; ultrasonically welding the first strip of insulating material and the second strip of insulating material and thereby securing together the first strip of insulating material and the second strip of insulating material; advancing and positioning the first strip of insulating material and the second strip of insulating material at a cutting station; severing the first strip of insulating material and the second strip of insulating material to establish an electrical connection insulator having a plurality of electrical insulating compartments; and wherein said method further comprises: deforming the second strip of insulating material, by means of pins or arbors disposed between the first and second strips of material, into a predetermined pattern to form at least partial compartments extending transversely relative to the direction of movement of the second strip, and wherein the deforming occurs while the pins or arbors are trapped between the first and second strips, and while both the first and second strips are undergoing movement and prior to securing together the first strip of insulating material and the second strip of insulating material and thereby facilitating the establishing of the plurality of electrical insulating compartments.

12. The method of claim 11 further including the step of reconfiguring at least one of the strips of insulating material to establish a substantially closed end for at least one compartment.

13. The method of claim 11 further including the step of heating the second strip of insulating material to facilitate deformation of the second strip of insulating material.

14. The method of claim 11 wherein ultrasonically welding includes welding the first strip of insulating material and the second strip of insulating material between each insulating compartment.

15. The method of claim 11 wherein severing the first strip of insulating material and the second strip of insulating material to establish a connection insulator having a plurality of insulating compartments includes severing a portion of the first sheet of insulating material for facilitating subsequent mounting in a stator assembly.

* * * * *